United States Patent [19]
Riesenberg et al.

[11] 3,949,252
[45] Apr. 6, 1976

[54] VEHICLE WHEEL ROTATION SPEED MEASURING SYSTEM

[75] Inventors: Klaus-Otto Riesenberg, Ludwigsburg-Ottweil; Walter Teegen, Hohenacker, both of Germany

[73] Assignee: Robert Bosch G.m.b.H., Gerlingen-Schillerhohe, Germany

[22] Filed: Mar. 10, 1975

[21] Appl. No.: 557,014

[30] Foreign Application Priority Data
Apr. 8, 1974 Germany............................ 2417030

[52] U.S. Cl. ............................................... 310/168
[51] Int. Cl.² ......................................... H02K 19/20
[58] Field of Search .................... 310/168, 152–159, 310/71

[56] References Cited
UNITED STATES PATENTS
3,887,046   6/1975   Bueler............................ 310/168 X

*Primary Examiner*—Donovan F. Duggan
*Attorney, Agent, or Firm*—Flynn & Frishauf

[57] ABSTRACT

To permit ready assembly and disassembly, without problems of centricity of relative elements, the hub cap of a wheel includes a stub shaft on which a stator is retained in fixed position with respect to the axle, by spring engagement means, the hub cap rotating with respect to the stator and carrying a magnet pole rotor ring, the spring engagement means additionally providing electrical contact between an armature winding in inductive relationship to the rotor ring.

7 Claims, 5 Drawing Figures

VEHICLE WHEEL ROTATION SPEED MEASURING SYSTEM

The present invention relates to a wheel speed measuring system, and more particularly to a transducer arrangement and system for automotive vehicle wheels in which electrical output signals are obtained representative of the actual speed of the wheel.

Vehicle wheel speed transducers are used, for example, to control the operation of anti-skid or anti-wheel brake locking systems. The accuracy of operation of such systems depends on the frequency of the output signal of the speed transducer. It is desirable to obtain a large number of pulses, for each wheel revolution, so that any change in wheel speed can be quickly detected. Such a wheel speed transducer, therefore, should provide output signals which accurately reflect the instantaneous wheel speed, and changes in instantaneous wheel speed. An additional important characteristic for such a transducer is the physical construction and association with the wheel itself. Such transducers, particularly if made in mass production, should be capable of being fitted to various types of wheels. Further, the transducer should be essentially unaffected by shocks and vibration, and relatively rotating and stationary parts should maintain an initially set centricity. Repairs, or replacement of individual elements should be simple and centricity of the transducer system should be retained after such repairs.

A wheel speed transducer has been proposed in which a plastic ring is located within the hub cap associated with a vehicle wheel, and permanent magnets are embedded in the plastic ring. An induction coil is associated with the plastic ring, fixedly secured to the axle, or shaft of the wheel. Such systems are difficult to maintain centered, and the relatively movable and stationary parts can easily be damaged when mounting and unmounting the wheel.

It is an object of the present invention to provide a vehicle wheel speed transducer, particularly for automotive-type wheels, which is essentially independent of various axle, wheel, or shaft constructions, is independent of size of bearings used to rotatably support the wheels, is simple in construction, and is readily accessible for replacement, or repair of components.

SUBJECT MATTER OF THE PRESENT INVENTION

Briefly, the hub cap has a stub shaft therein which holds a stator induction ring, or armature thereon, so that the hub cap can rotate with respect to the stator or armature. The hub cap includes a pole ring secured therein, in electromagnetic inductive relationship with respect to the induction, or armature ring. Electrical connections from the induction, or armature ring to the vehicle are carried by means of at least one contact spring element which resiliently engages a rigid contact element; one of these elements is located on the hub cap, the other on the axle, or shaft. Preferably, the spring carried on the hub cap, and the two elements additionally carry a matching, engaging projection-recess arrangement which holds the armature in fixed relationship with respect to the shaft, so that, with respect to the vehicle, it will be stationary, the pole ring being fixedly secured to the hub cap to rotate about the armature.

The invention will be described by way of example with reference to the accompanying drawings, wherein.

Figure 3:
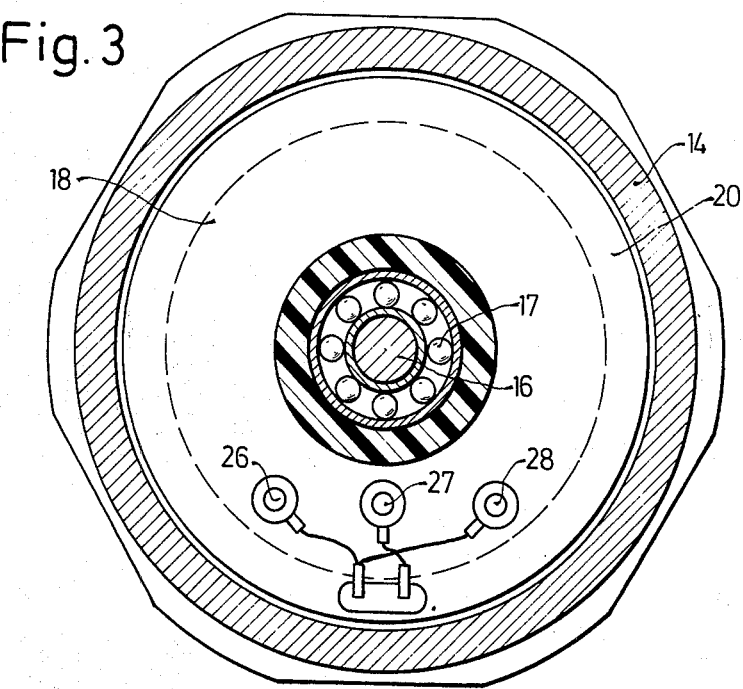
FIG. 3 is a transverse section along line III—III of FIG. 1.
Figure 4:
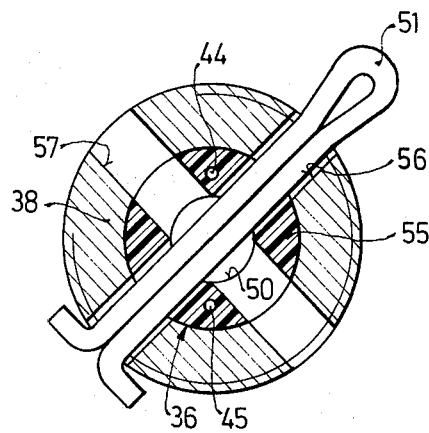
FIG. 4 is a section along line IV—IV of FIG. 1.
Figure 5:
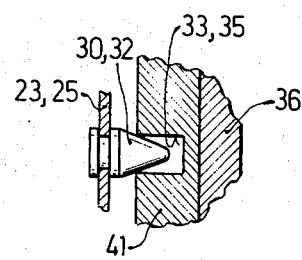
FIG. 5 is a fragmentary sectional view along line V—V of FIG. 2, drawn to an enlarged scale.

The scale of the drawings of FIGS. 1–4 is the same, FIG. 5 being enlarged.

An axle, or shaft 10 (FIG. 1) has a tapered roller bearing 11 located thereon, on which a wheel hub 12 is journalled. The end of the axle, or shaft is covered by a cap 14, in threaded engagement, as seen at 13, with the wheel hub 12. The hub cap 14, which also prevents contamination of the bearing (and which may be formed with additional projections, or elements to retain grease) is a generally drawn, cup-shaped body having a bottom 15, slightly bulged outwardly, and formed with a centrally located inwardly extending stub shaft 16. A ball bearing 17 is journalled on the stub shaft 16. The ball bearing 17 carries a disk-shaped armature element 18. This element, since it is stationary with respect to the vehicle axle 10, will be referred to as the stator although it rotates with respect to the hub cap 14. The stator 18 is formed at its outer circumference with an induction ring, or armature 20, in which a suitable armature winding (schematically shown) is located. The inside surface of hub cap 14 additionally carries a pole ring 21 which carries permanent magnet poles, as schematically illustrated in FIG. 2.

Figure 1:
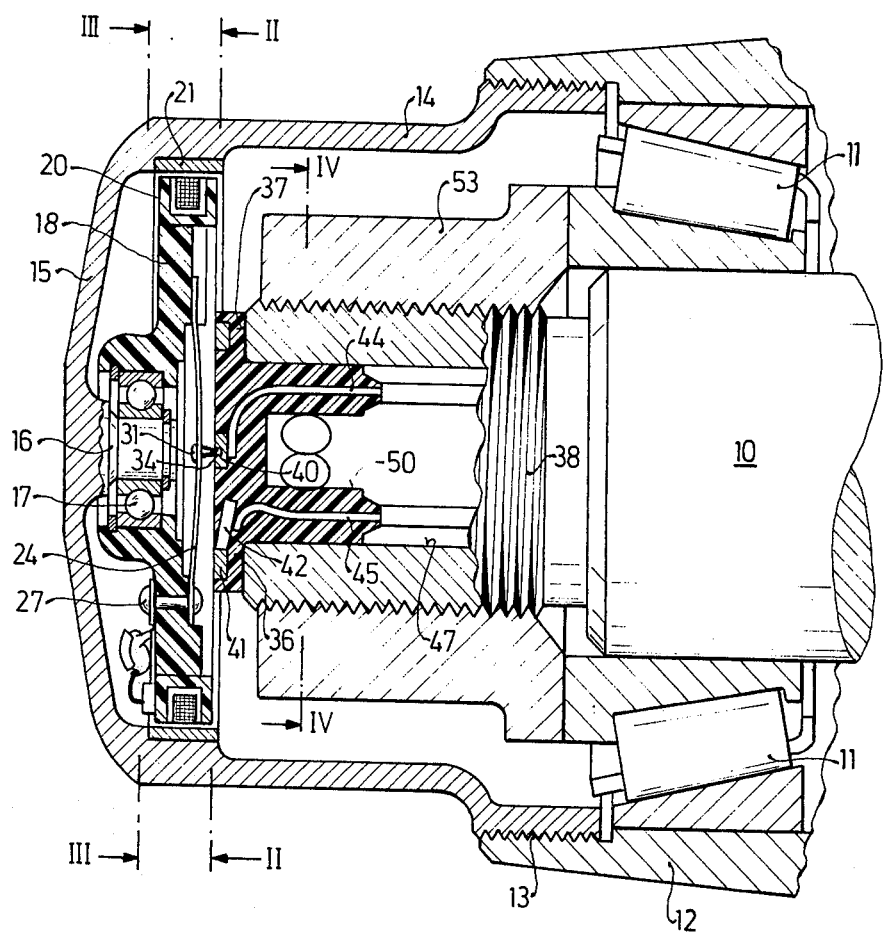
FIG. 1 is a longitudinal sectional view through the end of a vehicle wheel axle, a hub cap, and the transducer.

The ball bearing 17 is spanned at its inside by three leaf springs 23, 24, 25 (FIG. 2), of which only the central leaf spring 24 is visible in FIG. 1. The outer ends of the leaf springs 23, 24, 25 are engaged by the stator 18; one end of the respective leaf springs is secured to the stator 18 by rivets 26, 27, 28, the other ends being guided in matching grooves (FIG. 2) to prevent lateral excursion of the leaf springs. The leaf springs are convex in the region spanning ball bearing 17. Each one of the leaf springs 23, 24, 25 is formed with a central contact projection 30, 31, 32 (FIGS. 1, 2, 5), for example riveted to the respective leaf spring.

The respective contact projections 30, 31, 32 are engaged in matching depressions 33, 34, 35 formed in a contact block 36 secured to the end of the axle 10. Contact block 36 is centrally located on the end surface 37 of a projecting end stub 38, outwardly projecting from axle, or shaft 10. The contact block 37 has a central contact 40 (FIG. 1) located thereon, and additionally carries a contact ring 41. The contact ring 41 is formed with respective depressions 33, 35, located to be engaged by the projections 30, 32 of the outer springs 23, 25. A terminal 42 is secured to the contact ring 41, the terminal 42 being connected to a connection line 45 extending through the contact block 36 into a bore 47 in the end stub 38 of the axle. The central contact 40 likewise is connected to a terminal which, in turn, is connected to wire 44 also extending in bore 47. The contact block 36 is secured at the end of the stub 44, and prevented from rotation. FIG. 4 illustrates a diametrical bore 56, through which a Cotter pin 51 extends, securing nut 53 in position against rotation with respect to stub 38, and hence with respect to axle 10. Nut 53 secures the bearing 11, and hence hub 12 on position on the shaft 10. The projection 38 is further formed with a central bore 50. An additional transverse or diammetrical bore 57 (FIG. 4) may be provided, to permit adjustment of nut 53 with respect to bearing 11 by one-quarter the pitch of the thread on stub 38.

Figure 2:
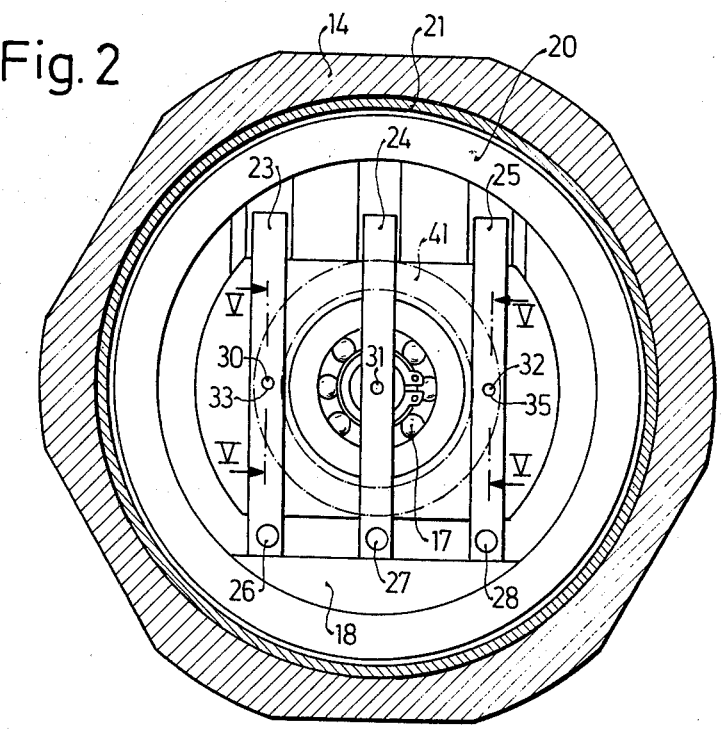
FIG. 2 is a transverse section along line II—II of FIG. 1.

FIG. 2 clearly shows the three springs 23, 24, 25 extending across the ball bearing 17 located on stub 16 on the inner surface of the end of the hub cap 15. The two chain-dotted circles in FIG. 2 illustrate the contact ring 41 of the terminal block 36, and the two depressions 33, 35 in which the contact projections 30, 32 are engaged. The central depression 34, engaged by the contact pin 31, has been omitted from FIG. 2 for clarity. It is not as important as the depressions 33, 35 for the pins 30, 32. The cross section of FIG. 3 illustrates the induction ring 20 on the stator 18 and ball bearing 17, located on the central stub 16 projecting from the cover 15 of the hub cap 14. The three rivets 26, 27, 28 form connections for the winding on the induction ring 20; the two outer rivets 26, 28 are electrically connected.

The central projection 55 on the contact block 36 is clearly seen in FIG. 4, as well as the connecting lines 44, 45. The axial extension 38 is formed with cross bores 56, 57, at right angles to each other, to selectively receive the Cotter pin 51.

The contact elements 30, 32, engaged in the respective depressions 33, 35, which may be notches (as shown) or holes, in ring 41 are best seen in FIG. 5. The contact projections 30, 32, as well as projection 31 on the central spring may be formed as riveted elements, as shown, or may be otherwise suitably secured to the respective spring, or formed thereon.

The entire actual transducer system is completely contained within the hub cap 14. Relatively rotating parts 20, 21 thus can be centered with respect to each other independently of the associated axle, or shaft 10. The electrical system of the transducer, itself, can be standard since it does not have to meet any specific requirements. The armature winding, shown only schematically in FIGS. 1 and 2 can be wound on, or molded into ring 18, with or without a core.

The transducer is secured within the hub cap 14, which is separable from the shaft, or axle. Electrical contacts to provide for electrical transmission of the pulses to the vehicle axle must thus be provided. Additionally, relative rotation between the ring 18 and the hub cap must be established. Both these requirements are met by the leaf springs 23, 24, 25 and the interengaging contact pins 30–32 with the notches, or depressions 33, 35 in the contact ring 41. The exact shape of the contact block 35 can readily be determined by the nature of the cable connection, that is, of the wire connection, or connecting flags, and is a matter of design. The contact block 36 can also be held in position by other means than a Cotter pin, as shown in FIG. 4; a radial set screw may be used, or the contact block could be screwed into the end hub part 38, or otherwise secured.

The transducer assembly has a number of advantages: The induction ring 20, secured to the stator disk 18, as well as the pole ring 21 are easily centered with respect to each other; assembly of the transducer to the shaft, or axle as such is effectively independent of manufacturing tolerances, or out-of-line positioning of the shaft with respect to the bearing on which the wheel rotates. The electrical contacts are automatically effected, after the hub cap is assembled to the wheel hub, and the transducer, as well as the associated contacts are protected, so that damage upon assembly of the hub cap to the hub is effectively eliminated. Further, a single type of rotation transducer is sufficient, since it is the hub cap which has to be matched to the wheel hub, and not the transducer as such. The transducer can be made to have a certain size, fitting the minimum size hub, and can then be located within a small stepped portion in the hub cap, which is then expanded as shown in FIG. 1 adjacent the screw connection 13.

A single contact pin is sufficient if there is good electrical connection between the hub cap and the chassis of the vehicle itself, that is, if the wheel, and hence the hub, and the vehicle frame are in good electrical connection. A single contact pin 30, or 32, securing the armature holder 18 and ring 20 against rotation would then be sufficient, although the symmetrical arrangement as shown in FIG. 2 is preferred. Use of the contact pins, and particularly a tapered engagement with a sharp edge (as shown in FIG. 5) provides good electrical contact, even in the presence of contaminating dust or oil.

Various changes and modifications may be made within the scope of the inventive concept.

We claim:

1. Vehicle wheel rotational speed measuring system, in which a wheel hub (12) is journalled on a shaft (10) and a hub cap (14) is provided, connected to the hub (12) to rotate with the wheel, said system comprising
    a magnet pole means (21) located inside the hub cap;
    a pick-up (20) located inside the hub cap and journalled therein to permit relative rotation of the hub cap with respect to the pick-up (20), said pick-up being in electromagnetic inductive relationship to said pole means; and comprising
    a disk-shaped element (20) having induction coil means located thereon, said disk-shaped element (20) being centrally journalled within the hub cap (14);
    first contact means carried by said pick-up and extending towards the shaft (10);
    second contact means carried by the shaft, said contact means being in engagement, and at least one of said contact means being resilient;
    said contact means (30, 31, 32, 33, 34, 35) comprising interengaging means mechanically securing said disk-shaped element (20) against rotation with respect to the hub cap (14);
    wherein one of said contact means comprises a contact concentric with the axis of rotation of said disk, and the other contact means comprises at least one additional contact eccentric with respect to said center of rotation;
    and wherein the contact means carried by said shaft comprises a contact block (36) having a metallic insert (41) formed with a depression (33, 35) in which said eccentrically located contact is engageable.

2. System according to claim 1, wherein said interengaging means comprises a projection formed on one of said contact means, and a depression formed on the other of said contact means and receiving said projection, the resiliency of one of said contact means providing for resilient engagement of the projection in the respective depression.

3. System according to claim 2, wherein the projection is tapered in cross section, and the depression has a sharp edge, engaging the tapered projection to provide for effective, good electrical contact and secure mechanical engagement.

4. Vehicle wheel rotational speed measuring system, in which a wheel hub (12) is journalled on a shaft (10) and a hub cap (14) is provided, connected to the hub (12) to rotate with the wheel, said system comprising
a magnet pole means (21) located inside the hub cap;
a pick-Up (20) located inside the hub cap and journalled therein to permit relative rotation of the hub cap with respect to the pick-up (20), said pick-up being in electromagnetic inductive relationship to said pole means;
first contact means carried by said pick-up and extending towards the shaft (10);
second contact means carried by the shaft, said contact means being in engagement, and at least one of said contact means being resilient;
wherein one of said contact means comprises at least two leaf springs (23, 24, 25) spanning across at least a portion of the shaft (10), one of said leaf springs being located centrally and extending across the center of rotation of the hub cap, and another of said leaf springs extending essentially parallel thereto.

5. System according to claim 4 wherein the pick-up means comprises a disk-shaped element (20) having an induction coil located thereon, said disk-shaped element carrying said leaf springs;
a stub shaft (16) secured to the inside of the hub cap and located essentially coaxially with the axis of rotation of the hub (12) of the wheel, the disk-shaped element being journalled (17) on the stub shaft (16) to permit rotation of the hub cap with respect to the disk-shaped element, the leaf springs spanning said stub shaft;
and wherein said second contact means comprises a contact block of insulating material having a central contact secured thereto and engageable by the leaf spring spanning across the center of the stub shaft, and having a laterally offset metallic region, engageable with the leaf spring laterally located with respect to the leaf spring spanning the center of the stub shaft (16);
and wherein interengaging means are formed on the leaf springs and said contact block, respectively, to provide for mechanical engagement of said leaf spring and said contact block, and hence restraining the disk-shaped element against rotation with respect to said contact block, and hence with respect to the shaft, while permitting said relative rotation between the hub cap and the disk-shaped element.

6. Vehicle wheel rotational speed measuring system, in which a wheel hub (12) is journalled on a shaft (10) and a hub cap (14) is provided, connected to the hub (12) to rotate with the wheel, said system comprising
a magnet pole means (21) located inside the hub cap;
a pick-up (20) located inside the hub cap and journalled therein to permit relative rotation of the hub cap with respect to the pick-up (20), said pick-up being in electromagnetic inductive relationship to said pole means;
first contact means carried by said pick-up and extending towards the shaft (10);
second contact means carried by the shaft, said contact means being in engagement, and at least one of said contact means being resilient;
and wherein said shaft (10) comprises a shaft extension (38), and said second contact means comprising a contact block (36) located on said extension (38) and concentrically with respect to said shaft (10).

7. Vehicle wheel rotational speed measuring system, in which a wheel hub (12) is journalled on a shaft (10) and a hub cap (14) is provided, connected to the hub (12) to rotate with the wheel, said system comprising
a magnet pole means (21) located inside the hub cap;
a pick-up (20) located inside the hub cap and journalled therein to permit relative rotation of the hub cap with respect to the pick-up (20), said pick-up being in electromagnetic inductive relationship to said pole means;
first contact means carried by said pick-up and extending towards the shaft (10);
second contact means carried by the shaft, said contact means being in engagement, and at least one of said contact means being resilient;
and wherein said first contact means carried by said pick-up comprises leaf springs, and said second contact means comprises a contact block (36) carrying fixed, rigid contact means located with respect to said leaf springs to be resiliently engaged by said leaf springs and, upon such engagement, forming a mechanical as well as an electrical connection.

* * * * *